(12) United States Patent
Miller et al.

(10) Patent No.: US 11,964,226 B2
(45) Date of Patent: Apr. 23, 2024

(54) FILTRATION SYSTEMS, FILTER ELEMENTS AND METHODS WITH WIRELESS POWER TRANSMISSION AND SEPARATE SIGNAL OUTPUT

(71) Applicant: Donaldson Company, Inc., Minneapolis, MN (US)

(72) Inventors: Danny W. Miller, Ackley, IA (US); Daniel E. Adamek, Bloomington, MN (US)

(73) Assignee: Donaldson Company Inc., Bloomington, MN (US)

(*) Notice: Subject to any disclaimer, the term of this patent is extended or adjusted under 35 U.S.C. 154(b) by 705 days.

(21) Appl. No.: 16/968,090

(22) PCT Filed: Feb. 7, 2019

(86) PCT No.: PCT/US2019/017059
§ 371 (c)(1),
(2) Date: Aug. 6, 2020

(87) PCT Pub. No.: WO2019/157187
PCT Pub. Date: Aug. 15, 2019

(65) Prior Publication Data
US 2021/0023495 A1    Jan. 28, 2021

Related U.S. Application Data

(60) Provisional application No. 62/627,425, filed on Feb. 7, 2018.

(51) Int. Cl.
*B01D 46/42* (2006.01)
*B01D 29/11* (2006.01)
*B01D 46/62* (2022.01)

(52) U.S. Cl.
CPC .......... *B01D 46/429* (2013.01); *B01D 29/114* (2013.01); *B01D 46/62* (2022.01);
(Continued)

(58) Field of Classification Search
CPC .... B01D 46/429; B01D 29/114; B01D 46/62; B01D 2201/291; B01D 2201/4023;
(Continued)

(56) References Cited

U.S. PATENT DOCUMENTS 7,012,685 B1 * 3/2006 Wilson ............... B01D 46/0086
356/432
2006/0060512 A1    3/2006 Astle et al.
(Continued)

FOREIGN PATENT DOCUMENTS

| CN | 1735445 | 2/2006 |
|---|---|---|
| CN | 101014398 | 8/2007 |

(Continued)

OTHER PUBLICATIONS

"First Office Action," for Chinese Patent Application No. 201980011969 dated Sep. 3, 2021 (17 pages) with English Translation.
(Continued)

*Primary Examiner* — Madeline Gonzalez
(74) *Attorney, Agent, or Firm* — Pauly, DeVries Smith & Deffner LLC (57) ABSTRACT

Aspects herein include filter elements and filtration systems. In an embodiment, a filter element for a filtration system is included. The filter element can include a filter body and a filter media disposed within the filter body. A wireless power receiver can be associated with the filter body. The wireless power receiver can include a receiving antenna, a control circuit in electrical communication with the wireless power receiver, and a feedback channel circuit in communication with the control circuit and configured to transmit through a
(Continued)

channel separate from the receiving antenna. Other embodiments are also included herein.

20 Claims, 8 Drawing Sheets

(52) U.S. Cl.
CPC .................. *B01D 2201/291* (2013.01); *B01D 2201/4023* (2013.01); *B01D 2201/54* (2013.01); *B01D 2201/56* (2013.01)

(58) Field of Classification Search
CPC ............ B01D 2201/54; B01D 2201/56; B01D 29/01; B01D 29/111; B01D 29/58; B01D 46/10; B01D 46/2411; B01D 46/525
USPC ..................... 210/85, 90, 103, 102, 141, 143
See application file for complete search history.

(56) References Cited

U.S. PATENT DOCUMENTS

| | | |
|---|---|---|
| 2006/0254986 A1 | 11/2006 | Hanson et al. |
| 2012/0303204 A1 | 11/2012 | Narisako et al. |

FOREIGN PATENT DOCUMENTS

| | | | |
|---|---|---|---|
| CN | 101218418 | 7/2008 | |
| JP | 2008027241 | 2/2008 | |
| JP | 2015013254 | 1/2015 | |
| JP | 2019055397 | 4/2019 | |
| JP | 2021512778 | 5/2021 | |
| WO | 2005113112 | 12/2005 | |
| WO | WO-2005113112 A1 * | 12/2005 | ........... B01D 35/143 |
| WO | 2017053755 | 3/2017 | |
| WO | 2017209684 | 12/2017 | |
| WO | 2019157187 | 8/2019 | |

OTHER PUBLICATIONS

"International Preliminary Report on Patentability," for PCT Application No. PCT/US2019/017059 filed Aug. 20, 2020 (7 pages).
"International Search Report and Written Opinion," for PCT Application No. PCT/US2019/017059 filed Apr. 18, 2019 (11 pages).
"Communication Pursuant to Article 94(3) EPC," for European Patent Application No. 19706222.7 filed May 2, 2022 (4 pages).
"First Examination Report," for Indian Patent Application No. 202017029381 filed Mar. 24, 2022 (5 pages).
"Office Action," for Japanese Patent Application No. 2020506320 filed Jun. 17, 2022 (10 pages) with English translation.
"Response to Communication Pursuant to Rules 161(1) and 162 EPC," for European Patent Application No. 19706222.7 filed Mar. 17, 2021 (21 pages).
"Second Office Action," for Chinese Patent Application No. 201980011969.X dated Apr. 21, 2022 (14 pages) with English Translation.
"First Office Action," for Japanese Patent Application No. 2020-538587 dated Dec. 23, 2022 (10 pages) with English translation.
"Third Office Action," for Chinese Patent Application No. 201980011969.X dated Sep. 22, 2022 (16 pages) with English translation.

* cited by examiner

FILTRATION SYSTEMS, FILTER ELEMENTS AND METHODS WITH WIRELESS POWER TRANSMISSION AND SEPARATE SIGNAL OUTPUT

This application is being filed as a U.S. national stage under 35 U.S.C. 371 claiming priority to PCT Application No. PCT/US2019/017059, filed Feb. 7, 2019, which claims priority to U.S. Provisional Patent Application No. 62/627, 425, filed Feb. 7, 2018, the contents of which are herein incorporated by reference in its/their entirety/entireties.

FIELD

Embodiments herein relate to filter elements and filtration systems.

BACKGROUND

Fluid streams often carry particulate material therein, in many instances, it is desirable to remove some or all of the particulate material from a fluid flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore desirable for such systems to remove the particulate material from the fluid flow upstream of the engine, turbine, furnace or other equipment involved. A variety of air filter or gas filter arrangements have been developed for particulate removal. Beyond particulate removal, filtration systems can also be used as gas phase or liquid phase contaminant removal systems.

Many filtration systems include filter elements that must be replaced and/or serviced at intervals in order to assure proper operation.

SUMMARY

Embodiments include filter elements and filtration systems. In an embodiment, a filter element for a filtration system is included. The filter element can include a filter body and a filter media disposed within the filter body. A wireless power receiver can be associated with the filter body. The wireless power receiver can include a receiving antenna, a control electrical communication with the wireless power receiver, and a feedback channel circuit in communication with the control circuit and configured to transmit through a channel separate from the receiving antenna.

In an embodiment, a filtration system is included having a filter element. The filter element can include a filter body, a filter media disposed within the filter body, a wireless power receiver associated with the filter body, and a control circuit in electrical communication with the wireless power receiver and a feedback channel circuit in communication with the control circuit. A filter housing can be included, the filter housing including an interior volume. The filter element can configured to fit within the interior volume of the filter housing. A wireless power emitter can be associated with the filter housing. A signal receiver can also be associated with the housing.

In an embodiment a filtration system is included. The filtration system can include spin-on canister filter, a wireless power receiver associated with the spin-on canister filter, a control circuit in electrical communication with the wireless power receiver and a feedback channel circuit in communication with the control circuit. A filter head can be configured to receive the spin-on canister filter. A wireless power emitter associated with the filter head and a signal receiver associated with the housing.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Embodiments herein can include filter elements and filtration systems wherein power can be wirelessly provided to a filter element to operate circuits/hardware contained thereon including, but not limited to, control circuits, sensors and/or other hardware. Power can be transferred wirelessly using various wireless power transmission technologies including, but not limited to, the use of time-varying electric, magnetic, or electromagnetic fields. Wireless power transmission approaches used herein can include both non-radiative and radiative techniques. In near-field or non-radiative techniques, power is transferred by magnetic fields using inductive coupling between coils of wire, or by electric fields using capacitive coupling between metal electrodes, in various embodiments herein, inductive coupling can be used to deliver power to the tag component wirelessly.

In some specific embodiments, electromagnetic induction between two loop antennas is employed. In one approach, when the wireless power receiver is placed within range of the wireless power emitter, an antenna coil and capacitor, which form a tuned circuit, absorb and store energy from the field, resonating like an electrical version of a tuning fork. This energy can be rectified to direct current which then provides power to components of the filter element.

Frequently, it can be desirable for the filter element to provide a signal and/or feedback which is received by another component of the filtration system such as a filter housing. As one example, the signal could relate to the output of a sensor associated with the filter element. The signal can relate to various factors such as the filter conditions, predicted end-of-life of the filter element, conditions of the fluid being filtered, aspects related to particulates or other contaminants within the fluid being filtered, etc.

In some cases, a signal can be reported out from the filter element using some of the same hardware that is used to wireless receive power. For example, the same antenna or coil used to receive power through inductive techniques could be used to transfer information out from the filter element. However, it can be desirable for the filter element to be enabled to produce a signal using other hardware. In various embodiments herein the filter element can receive power wirelessly and then transmit a signal out to another component of a filtration system (such as a filter housing) using a feedback channel that is separate from the wireless power receiving hardware. By way of example, the feedback channel can be an optical feedback channel. However, other types of feedback channels are also contemplated herein. In various embodiments, use of a separate feedback channel can male signal generation and/or reception more reliable, more energy efficient, and/or easier to implement.

Figure 1:
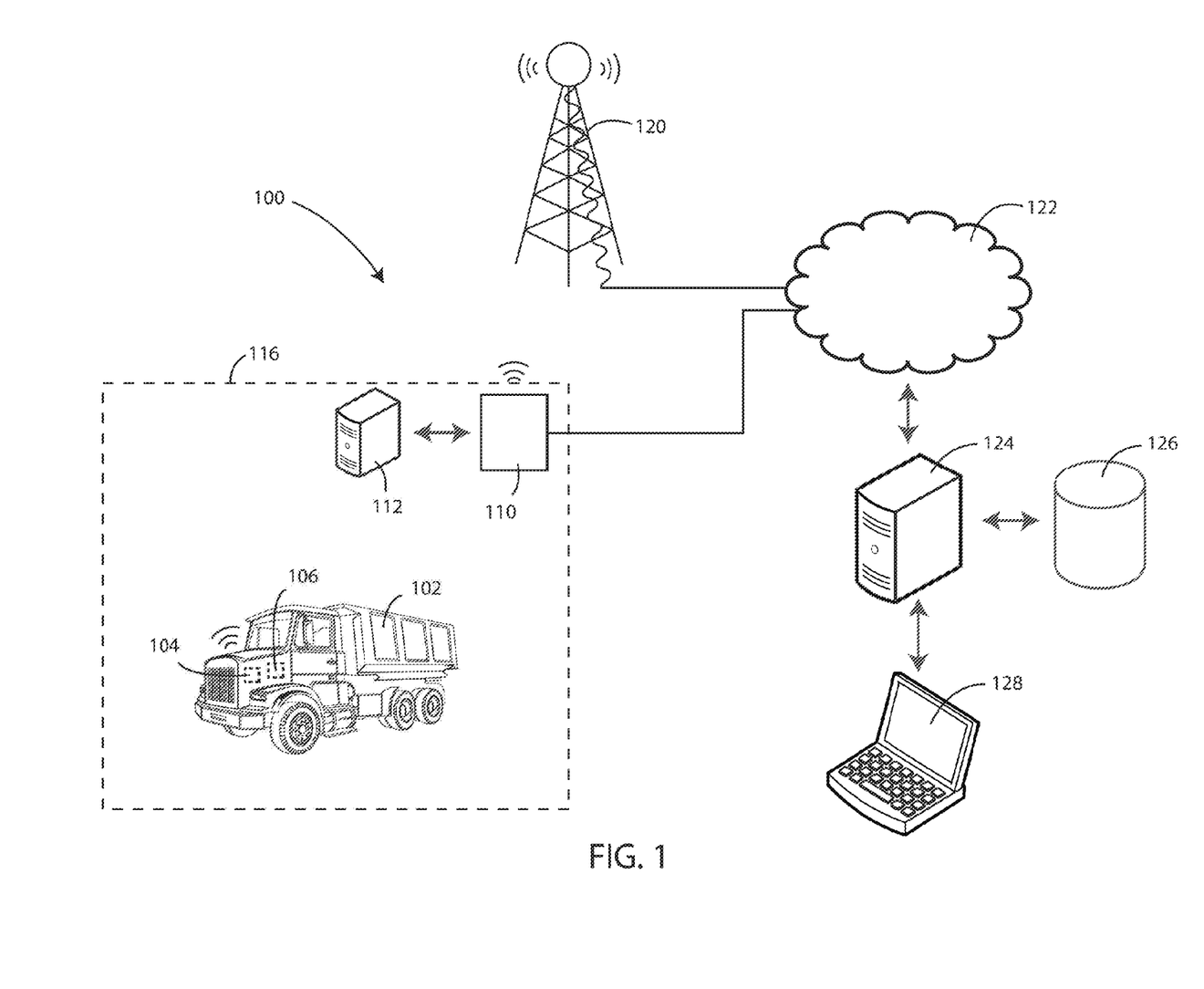
FIG. 1 is a schematic view a filtration system data communication environment 100.

Referring now to FIG. 1, a schematic view of a filtration system data communication environment 100 is shown. A machine 102, such as a vehicle, can include an engine control unit 104 (ECU) and a filtration system 106. The filtration system 106 can be for various purposes including, but not limited to, filtering fluids such as incoming air, fuel, lubricating oils, or exhaust gases. In some embodiments, the machine 102 includes multiple filtration systems. Exemplary filtration systems are described in greater detail below.

In some embodiments, the filtration system 106 can be in electronic communication with the ECU 104 in either a wired or wireless manner. In some embodiments, the filtration system 106 can emit and/or receive wireless signals to or from components that are external to the machine 102 or vehicle, either bypassing the ECU 104 or in parallel with wired or wireless signals exchanged with the ECU 104. However, in other embodiments, the filtration system 106 may not communication with components that are external to the machine 102.

The machine 102 can be within a work environment 116. The work environment 116 can represent a geographic area in which the machine 102 primarily operates. Depending on the nature of the machine 102, the work environment 116 could be quite large (10s to 1000s of square miles) or relatively small (less than 10 or even 1 square mile). The work environment 116 can be, for example, a mining facility, a construction site, a shipping or distribution center, a production facility, the like. In some embodiments, a gateway or repeater unit 110 can be disposed within the work environment 116. The gateway or repeater unit 110 can, in some embodiments, communicate wirelessly with the machine 102 and/or components thereof such as the filtration system 106 and/or the ECU 104. In some embodiments, the gateway or repeater unit 110 can be connected to an external data network 122, such as the Internet or various private networks. In some embodiments, the data network 122 can be a packet-switched network. In some embodiments, the gateway or repeater 110 can also include data network router functionality.

In some embodiments, a server 112 can also be disposed in the work environment 116. The server 112 can receive data from the gateway or repeater unit 110. It will be appreciated, however, that in many embodiments there may not be a server 112 in the work environment 116.

In some embodiments, wireless signals from one or more of the components such as the machine 102, ECU 104, filtration system 106, gateway or repeater unit 110, can be exchanged with a wireless communication tower 120 (or antenna array), which could be a cellular tower or other wireless communication tower. The wireless communication tower 120 can be connected to a data network 122, such as the Internet or another type of public or private data network, packet-switched or otherwise.

The data network can provide for one-way or two-way communication with other components that are external to the work environment 116. For example, a server 124 or other processing device can receive electronic signals containing data from one or more components such as the machine 102, ECU 104, filtration system 106, gateway or repeater unit 110, or the like. The server 124 can interface with a database 126 to store data. In some embodiments, the server 124 (or a particular device that is part of the server system) can interface with a user device 128, which can allow a user to query data stored in the database 126.

Data produced by the filtration system 106 can be of various types. In some embodiments, data produced by the filtration system 106 can include data regarding pressure drop, pressure drop change over time, primary filter removal events and/or counts of same, secondary filter removal events and/or counts of same, primary filter hours of usage, secondary filter hours of usage, primary filter installation dates and times and/or counts of installation events, secondary filter installation dates and times and/or counts of installation events, and the like.

Figure 2:
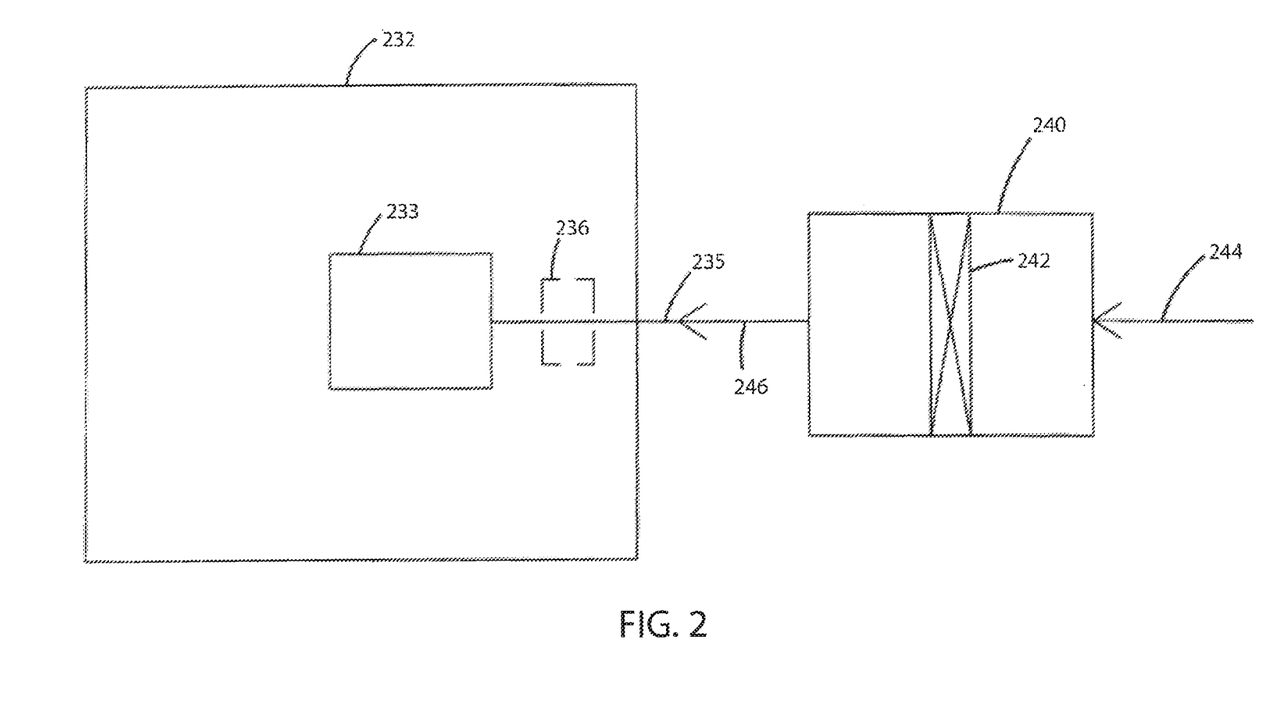
FIG. 2 is a schematic view of an embodiment of a system in which filtration systems according to the present disclosure are used.

Referring now to FIG. 2, a schematic view is shown of an embodiment of a system in which filtration systems according to the present disclosure are used. In FIG. 2, equipment 232, such as a vehicle, having an engine 233 with some defined rated air flow demand, for example at least 50 cfm and up to 1800 cfm, is shown schematically. The equipment 232 may be a bus, an over-the-highway truck, an off-road vehicle, a tractor, a light-duty or medium duty truck, or a marine application such as a powerboat. The engine 233 powers the equipment 232, through use of an air and fuel mixture. In FIG. 2, air flow is shown drawn into the engine 233 at an intake region 235. An optional turbo 236 is shown in phantom, as optionally boosting the air intake into the engine 233. A filtration system 240 having a filter construction 242 is upstream of the engine 233 and the turbo 236. In general, in operation, air is drawn in at arrow 244 into the filtration system 240 and through the filter construction 242. There, particles and contaminants are removed from the air. The cleaned air flows downstream at arrow 246 into the intake 235. From there, the air flows into the engine 233 to power the equipment 232.

Figure 3:
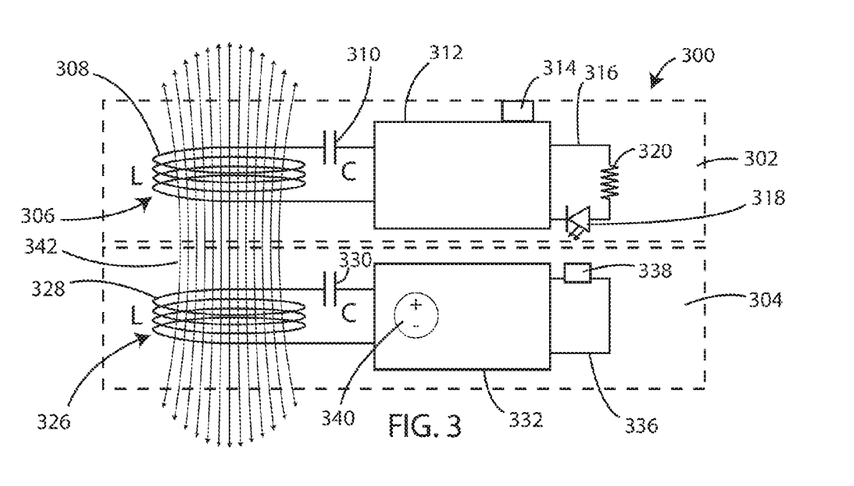
FIG. 3 is a schematic view of portions of a filtration system according to various embodiments herein.

Referring now to FIG. 3, a schematic view is shown of portions of a filtration system 300 according to various embodiments herein. The filtration system 300 can include a filter element 302 and a filter housing 304. For ease of schematic illustration, the filter element 302 and the filter housing 304 are simply shown disposed adjacent to one another. However, it will be appreciated that in many embodiments the filter element 302 can be configured to fit within at least a portion of the filter housing 304. The filter element 302 can include a filter body (not shown in FIG. 3) and filter media (not shown in FIG. 3). The filter element 302 can further include a wireless power receiver 306 associated with the filter body. In some embodiments, the wireless power receiver 306 can be permanently integrated into the filter body. In other embodiments, the wireless power receiver 306 can be removably attached to the filter body. The wireless power receiver 306 can also include components such as a receiving antenna 308 and a capacitor 310, The filter element 302 can also include a control circuit 312 in electrical communication with the wireless power receiver 306. The filter element 302 can also include a feedback channel circuit 316 in communication with the control circuit 312 and configured to transmit through a channel separate from the receiving antenna 308.

In this example, the receiving antenna 308 is an inductor. However, the receiving antenna 308 can also take on other forms. In various embodiments, the wireless power receiver 306 can include an LC circuit. In various embodiments, the wireless power receiver 306 can include an RF power receiver. The wireless power receiver 306 can be disposed on or in the filter body.

In some embodiments, the feedback channel circuit can include an optical feedback channel circuit. In some embodiments, the filter element 302 can further include an optical emitter 318 in electrical communication with the optical feedback channel circuit and/or other electrical components 320. In some embodiments, the optical emitter can include a light emitting diode. In some embodiments, the optical emitter can include an infrared light emitting diode.

In some embodiments, a signal emitter can convey data. For example, an optical signal emitter can convey digitized information by cycling on and off, which can correspond to the "0s" and "1s" of a binary data format. In other embodiments, on and off periods of a signal emitter can correspond to a non-binary data format.

The data itself can represent various types of data including, but not limited to, data derived from a sensor (described below).

In other embodiments, a signal emitter can serve as a portion of a sensor. For example, in the context of sensing a property of a fluid through absorbance, transmittance, or other optical or non-optical phenomena, the signal emitter can serve to generate a signal and a detector (associated with the filter housing) can receive the signal from signal emitter.

In some embodiments, the filter element 302 can further include a sensor 314 in electrical communication with the control circuit 312. Many different types of sensors are contemplated herein. By way of example, the sensor 314 can be a pressure sensor, a temperature sensor, a vibration sensor, a particulate sensor, a gas concentration sensor, or the like.

In some embodiments, data derived from the sensor 314 is transmitted to an external receiver, such as a receiver associated with the filter housing 304, through the feedback channel circuit 316.

The filter housing 304 can define an interior volume and the filter element 302 can be configured to fit within the interior volume of the filter housing 304. A wireless power emitter 326 can be associated with the filter housing 304. The wireless power emitter 326 can also include components such as an emitting antenna 328 and a capacitor 330. The filter housing 304 can also include a control circuit 332 in electrical communication with the wireless power emitter 326. A signal receiver 336 can be associated with the filter housing 304 and can be configured to receive a signal from the feedback channel circuit 316. In some embodiments, the signal receiver 336 can include an optical detector 338. Various circuitry can be associated with the control circuit 332 such as a power supply 340.

In this example, the emitting antenna 328 is an inductor. However, the emitting antenna 328 can also take on other forms. In various embodiments, the wireless power emitter 326 can include an LC circuit. In the view shown in FIG. 3, the emitting antenna 328 creates an electromagnetic field 342 which is then received through the receiving antenna 308.

In accordance with various embodiments the control circuit 332 can include and/or be in electric communication with data stores including memory circuits for data storage that can be read, and under some circumstances written to.

In some embodiments, the filter housing can define a fluid flow path between the filter housing and the filter element and the fluid flow path can pass (at least partially) between the optical emitter and the signal receiver.

Figure 4:
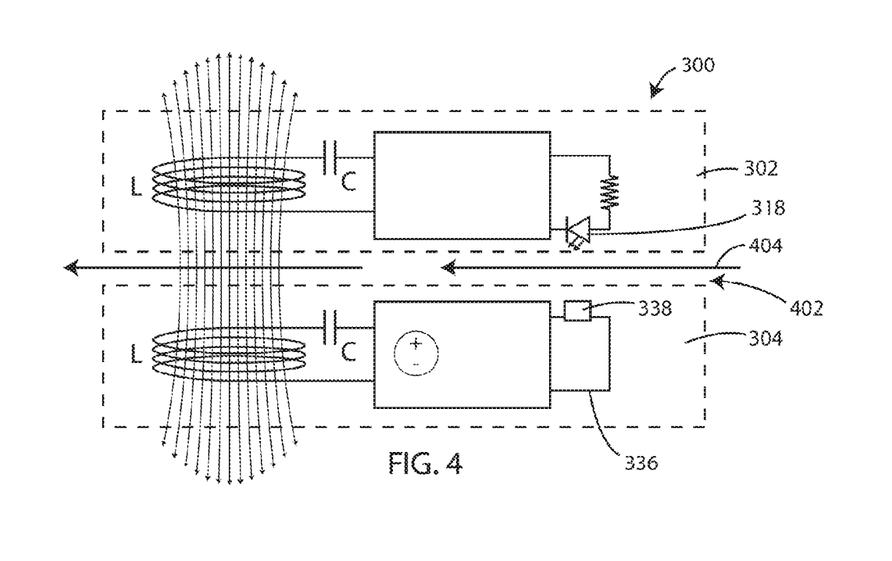
FIG. 4 is a schematic view of portions of a filtration system according to various embodiments herein.

Referring now to FIG. 4, a schematic view is shown of portions of a filtration system 300 according to various embodiments herein. In this embodiment, the filter housing 304 defines a fluid flow path 402, through which a fluid flows 404 when the filtration system 300 is in operation. The fluid flow path 402 can pass between the optical emitter 318 and the optical detector 338. In this manner, aspects regarding the fluid passing through the fluid flow path 402 can be ascertained by evaluating the signal as received by the optical detector 338. Aspects of the fluid that can be determined optically can include turbidity, color, absorbance, and the like. It will be appreciated, however, detectors other than optical detectors can also be used. By way, of example, instead of optical emitter 318 and the optical detector 338, a first electrode and a second electrode could be used. In still other embodiments, instead of optical emitter 318 and the optical detector 338, a sound or vibration emitter and a vibration detectors could be used. Many types of emitters and detectors are contemplated.

Figure 5:
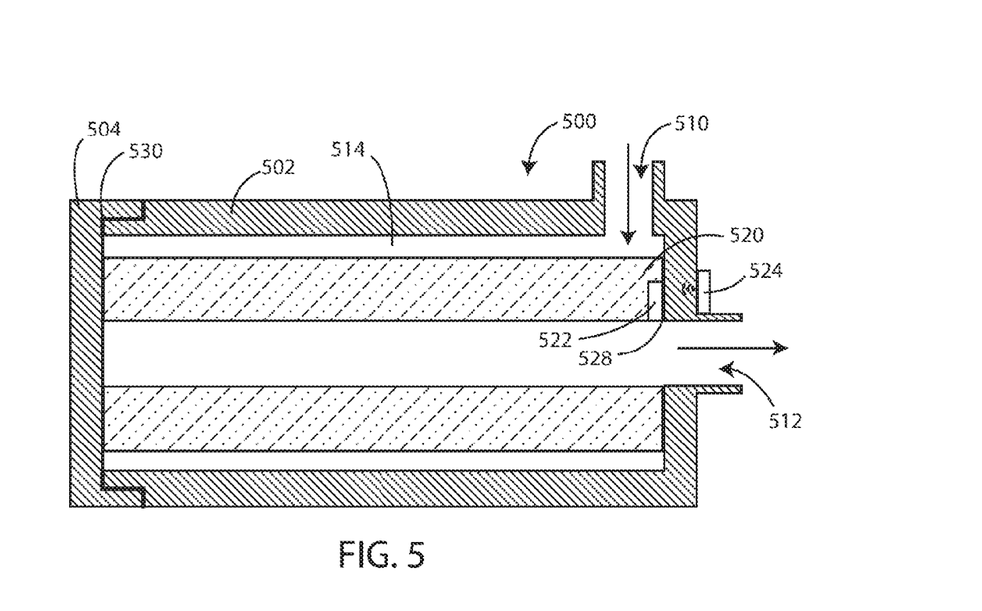
FIG. 5 is a schematic cross-sectional view of a filtration system with a primary filter element installed therein in accordance with various embodiments herein.

Referring now to FIG. 5, a schematic cross-sectional view is shown of a filtration system 500 with a primary filter element 520 installed therein in accordance with various embodiments herein. The filtration system 500 can include a housing 502 comprising a fluid inlet 510 and a fluid outlet 512, the housing defining an internal volume 514. A primary filter element 520 can be disposed within the internal volume 514 of the housing 502 and can be configured to be removably disposed therein. In the view shown in FIG. 5, the primary filter element 520 is fully inserted into the housing 502 such that the primary filter element 520 is at a position that is close to or contacting the distal end 528 of the internal volume 514. At the opposite side of the internal volume 514 is the proximal end 530 of the internal volume 514. The proximal end 530 of the internal volume 514 is configured to engage with a removable cover 504 that fits adjacent to the proximal end 530 in order to seal off the proximal end of the housing from the flow of fluid there through. The removable cover 504 can engage the proximal end 530 and remain attached thereto through various devices or structures including threads, friction-fit mechanisms, latches, buckles, snap-fit mechanisms, or the like.

A power receiving and signaling element 522, can be associated with a filter element 520. The power receiving and signaling element 522 can include features associated with the filter element 302 as described with reference to FIG. 3 above. A power transmitting and signal receiving element 524, can be disposed in or on the housing 502. The power transmitting and signal receiving element 524 can include features associated with the filter housing 304 as described with reference to FIG. 3 above. The power transmitting and signal receiving element 524 can be configured to wirelessly send power to and a signal back from the power receiving and signaling element 522.

The positions of the power receiving and signaling element 522 and the power transmitting and signal receiving element 524 with respect to other components of the filter element and the filter housing can vary. In the example of FIG. 5, the power receiving and signaling element 522 and the power transmitting and signal receiving element 524 are positioned immediately adjacent to one another. However, referring to FIG. 6, the power receiving and signaling element 522 and the power transmitting and signal receiving element 524 are separated from one another across a fluid flow path 602.

Figure 6:
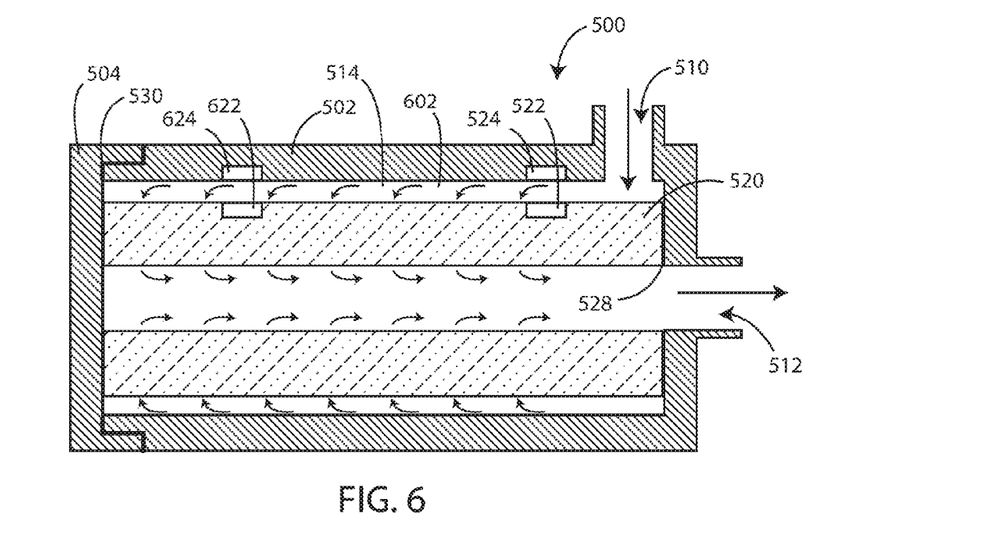
FIG. 6 is a schematic cross-sectional view of a filtration system with a primary filter element installed therein in accordance with various embodiments herein.

In addition, FIG. 6 shows more than a single power receiving and signaling element 522 and a single power transmitting and signal receiving element 524. In this example, a second power receiving and signaling element 622 and a second power transmitting and signal receiving element 624 are shown. The second power receiving and signaling element 622 and the second power transmitting and signal receiving element 624 separated from one another across a fluid flow path 602, but in this case they are located farther away from fluid inlet 510 than the other power receiving and signaling element 522 and power transmitting and signal receiving element 524.

In some cases, where there is more than one power receiving and signaling element 522 and/or more than one power transmitting and signal receiving element 524, certain components of the same (such as those shown in FIG. 3) can be shared. For example, in some embodiments, the first power receiving and signaling element 522 may include hardware, such as an antenna, to wirelessly receive power and then share the received power with the second power receiving and signaling element 622 through a wired connection passing through the filter element.

It will be appreciated that embodiments of filtration systems herein can include more than a single filter element. For example, in some embodiments herein, filtration systems can be configured to including a primary filter element and a secondary filter element. The primary filter element can perform most or all of the filtering activity during normal operation. However, if the primary filter fails, then the secondary filter element (or backup filter element) can protect the machine into which the filtration system is disposed by filtering the fluid for a period of time. In some embodiments, primary and secondary filters are changed at the same frequency. However, in other embodiments, primary filters are changed at a frequency that is greater than the frequency for changing secondary filters.

Figure 7:
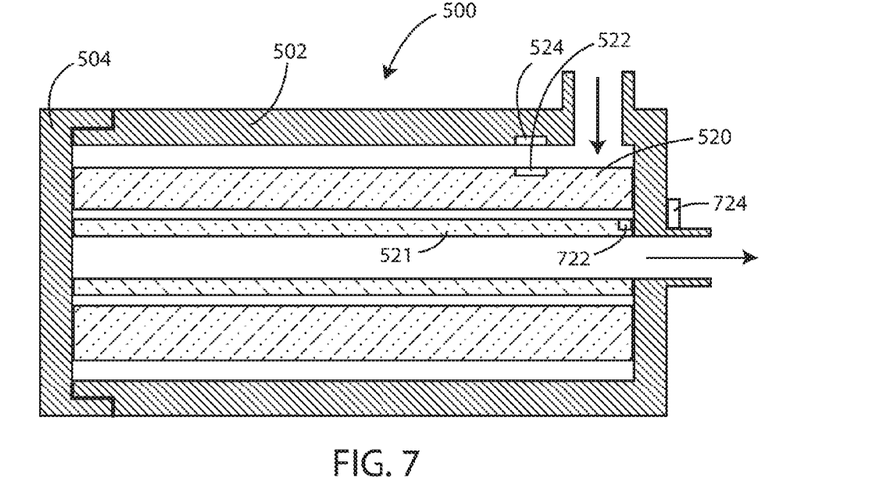
FIG. 7 is a schematic cross-sectional view of a filtration system with a primary filter element and a secondary filter element installed therein in accordance with various embodiments herein.

Referring now to FIG. 7, a schematic cross-sectional view is shown of a filtration system 500 with a primary filter element 520 and a secondary filter element 521 installed therein in accordance with various embodiments herein. The filtration system 500 can include a housing 502 comprising a fluid inlet 510 and a fluid outlet 512, the housing defining an internal volume 514. A primary filter element 520 can be disposed within the internal volume 514 of the housing 502 and can be configured to be removably disposed therein. A secondary filter element 521 can be disposed within the internal volume 514 of the housing 502 and can also be configured to be removably disposed therein, with or without simultaneously removing the primary filter element 520.

In the view shown in FIG. 7, the primary filter element 520 and secondary filter element 521 are fully inserted into the housing 502 such that the primary and secondary filter elements 520, 521 are at a position that is close to or contacting the distal end 528 of the internal volume 514. At the opposite side of the internal volume 514 is the proximal end 530 of the internal volume 514. The proximal end 530 of the internal volume 514 is configured to engage with a cover 504 that fits adjacent to the proximal end 530 in order to seal off the proximal end of the housing from the flow of fluid there through.

A first power receiving and signaling element 522 can be associated with, such as disposed on or in, the primary filter element 520 and a second power receiving and signaling element 722 can be associated with, such as disposed on or in, the secondary filter element 521. A first power transmitting and signal receiving element 524 can be disposed in or on the housing 502 and a second power transmitting and signal receiving element 724 can also be disposed in or on the housing 502. The first power transmitting and signal receiving element 524 can be configured to wirelessly send power to and receive signals from the first power receiving and signaling element 522. The second power transmitting and signal receiving element 724 can be configured to wirelessly send power to and receive signals from the second power receiving and signaling element 722.

Figure 8:
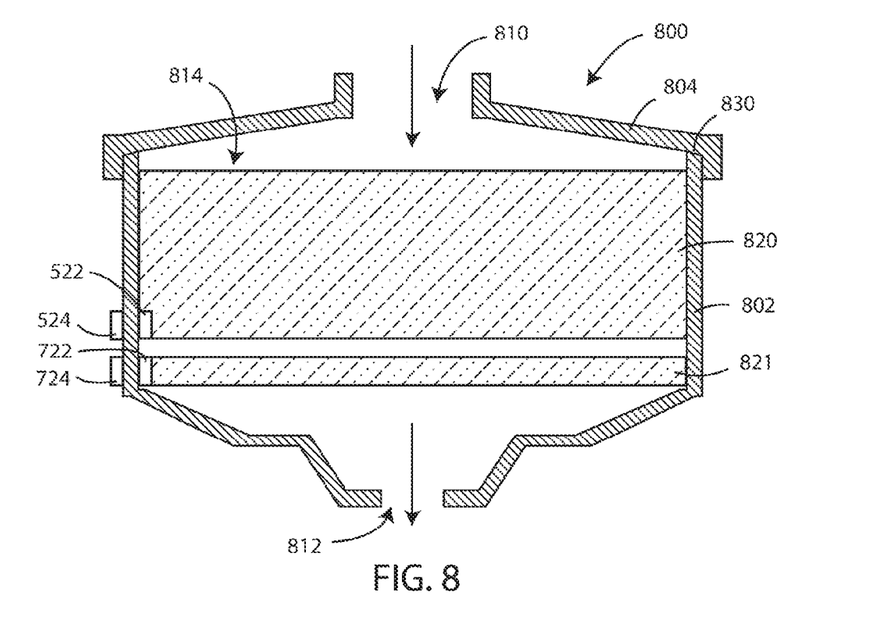
FIG. 8 is schematic cross-sectional view is shown of a filtration system with a primary filter element and a secondary filter element installed therein in accordance with various embodiments herein.

It will be appreciated that filtration systems herein can take on many different shapes and configurations. Referring now to FIG. 8, a schematic cross-sectional view is shown of a filtration system 800 with a primary filter element 820 and a secondary filter element 821 installed therein in accordance with various embodiments herein. The filtration system 800 can include a housing 802 comprising a fluid inlet 810 and a fluid outlet 812. The housing can define an internal volume 814. The primary filter element 820 can be disposed within the internal volume 814 of the housing 802 and can be configured to be removably disposed therein. The secondary filter element 821 can be disposed within the internal volume 814 of the housing 802 and can also be configured to be removably disposed therein. In this embodiment, the primary filter element 820 can be removed with or without also removing the secondary filter element 821.

At the opposite side of the internal volume 814 is the proximal end 830 of the internal volume 814. The proximal end 830 of the internal volume 814 is configured to engage with a cover 804 that fits adjacent to the proximal end 830 in order to seal off the proximal end of the housing from the flow of fluid there through.

A first power receiving and signaling element 522 can be associated with, such as disposed on or in, the primary filter element 820 and a second power receiving and signaling element 722 can be associated with, such as disposed on or in, the secondary filter element 821. A first power transmitting and signal receiving element 524 can be disposed in or on the housing 802 and a second power transmitting and signal receiving element 724 can also be disposed in or on the housing 802. The first power transmitting and signal receiving element 524 can be configured to wirelessly send power to and receive signals from the first power receiving and signaling element 522. The second power transmitting and signal receiving element 724 can be configured to wirelessly send power to and receive signals from the second power receiving and signaling element 722.

Figure 9:
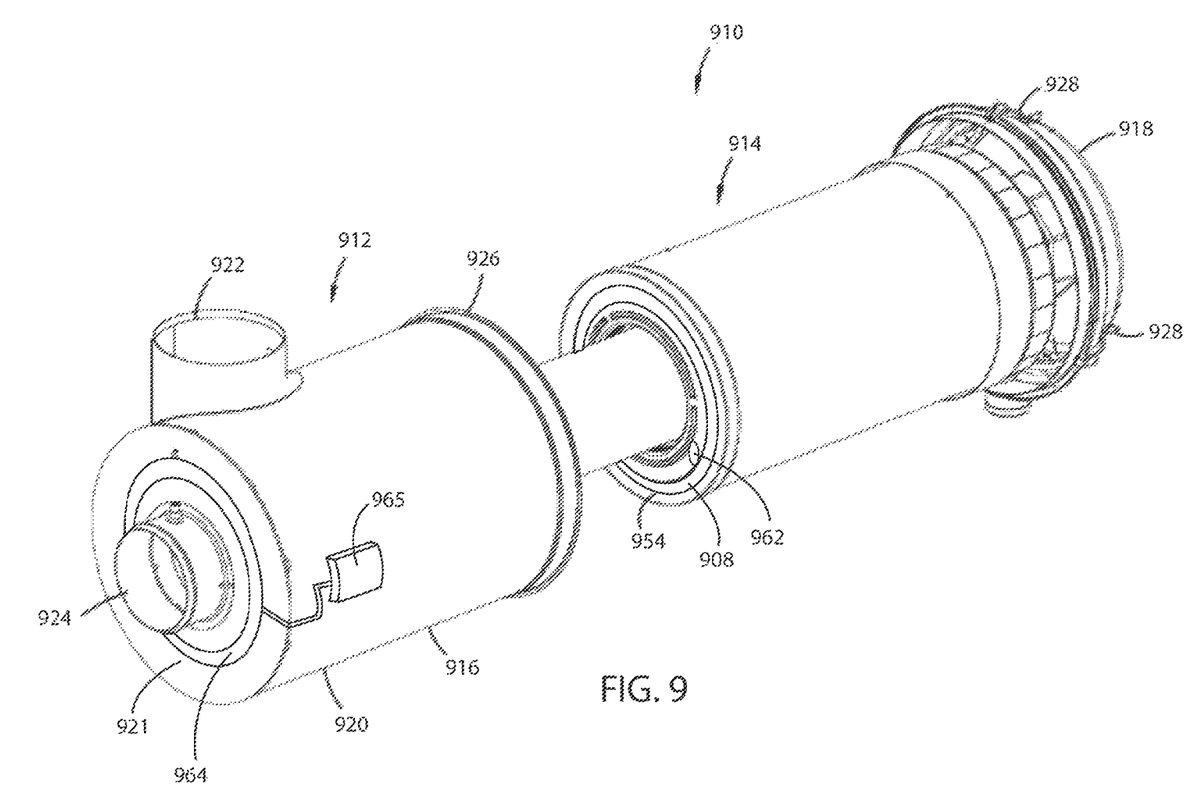
FIG. 9 is an exploded, perspective view is shown of a filtration system including a housing and a filter element, constructed according to principles of this disclosure.

As referenced above, many different shapes and configurations for filtration systems are contemplated herein. Referring now to FIG. 9, an exploded, perspective view is shown of a filtration system 910 including a housing 912 and a removable and replaceable primary filter element 914. In the example shown, the housing 912 includes a housing body 916 and a removable service cover 918. The cover 918 provides for service access to an interior of the housing body 916 for servicing. Far a filtration system 910 of the general type depicted in FIG. 9, servicing generally involves dismounting and removing from the housing 912 at least one filter element, such as filter element 914 depicted, either for refurbishing or replacement.

The housing 912 depicted includes an outer wall 920 having an end 921, an air inlet 922, and an air outlet 924. For the embodiment depicted, the inlet 922 and the outlet 924 are both in the housing body 916. In other embodiments, at least one of the inlet 922 or outlet 924 can be part of the cover 918. In typical use, ambient or unfiltered air enters the filtration system 910 through the inlet 922. Within the filtration system 910, the air is passed through the filter element 914 to obtain a desirable level of particulate removal. The filtered air then passes outwardly from the filtration system 910 through the outlet 924 and is directed by appropriate duct work or conduits to an inlet of an air intake for an associated engine, or compressor, or other system.

While FIG. 9 describes a filter element for particulate removal, it will be appreciated that embodiments herein can also including filtration systems and/or filter elements for removal of gas phase and/or liquid phase contaminants.

The particular filtration system 910 depicted has outer wall 920 defining a barrel shape or generally cylindrical configuration. In this particular configuration, the outlet 924 can be described as an axial outlet because it generally extends in the direction of and circumscribes a longitudinal central axis defined by the filter element 914. The service cover 918 generally fits over an open end 926 of the housing body 916. In the particular arrangement shown, the cover 918 is secured in place over the end 926 by latches 928.

FIG. 9 also shows a receiving antenna 908, which can be part of wireless power receiver, and a signal emitter 962, which can be part of a feedback channel circuit, disposed on the first end cap 954 of the filter element 914. An emitting antenna 964 can be mounted on or in the end 921 of the housing 912. In some embodiments, the emitting antenna 964 can be part of a wireless power emitter, and can be in electrical communication with a system controller 965. A signal receiver (not shown in this view) can be associated with the housing 912 and can receive a signal from the signal emitter 962. The system controller 965 can include various circuitry for telemetry, storage and/or processing of data (including RAM/ROM and/or data registers), power storage and/or modulation, and the like. In some embodiments the system controller 965 can include a microprocessor, a microcontroller, an application specific integrated circuit (ASIC), or the like.

The terms "filter element" or "element" used herein refer to a removable, replaceable component that includes filter media through which the fluid being filtered passes, as the fluid is directed, from the inlet 922, through the interior, to the outlet 924, with the element 914 performing a filtration function. Unless otherwise stated, the terms "element", "filter element", and "filter" are meant to refer to a removable and replaceable component within the filtration system 910. Preferably, filter elements are configured such that they can be removed and replaced by hand, at appropriate service intervals.

Herein, the term "primary element" or "primary filter element" generally refers to a filter element in which a majority of dust, particulate, or other contaminant loading occurs during filtration system use. In typical systems that have two elements, the primary element is positioned upstream from the safety element, during typical assembly. By "upstream" in this context, it is meant that due to filter element position, filtration system configuration, and the location of seals during use, air or another fluid generally must pass through the primary element before the air or other fluid passes through the safety element when the air or other fluid moves from the inlet 922 to the outlet 924.

Herein, the term "secondary element" or "safety element" refers to a downstream element from the primary element. Typically, very little dust, particulate or other contaminant loading occurs on the safety element and generally occurs only as a result of either failure of some portion of the primary element or failure of a seal, or inadvertent dust movement during servicing of the primary element, or some other mishap.

While many of the filter elements and housings shown so far herein depict cylindrically shaped filter elements and housings configured to fit the same, it will be appreciated that filter elements having many different shapes are contemplated herein. In addition, while embodiments referenced above that include secondary or safety filter elements show such secondary or safety filter elements fitting within a primary filter element, many other configurations of filtration systems including primary and secondary filter elements are contemplated herein. References to a "first filter element" can refer to either a primary or a secondary filter element as described herein, depending on the context. Similarly, references to a "second filter element" can refer to either a primary or a secondary filter element as described herein, depending on the context.

Figure 10:
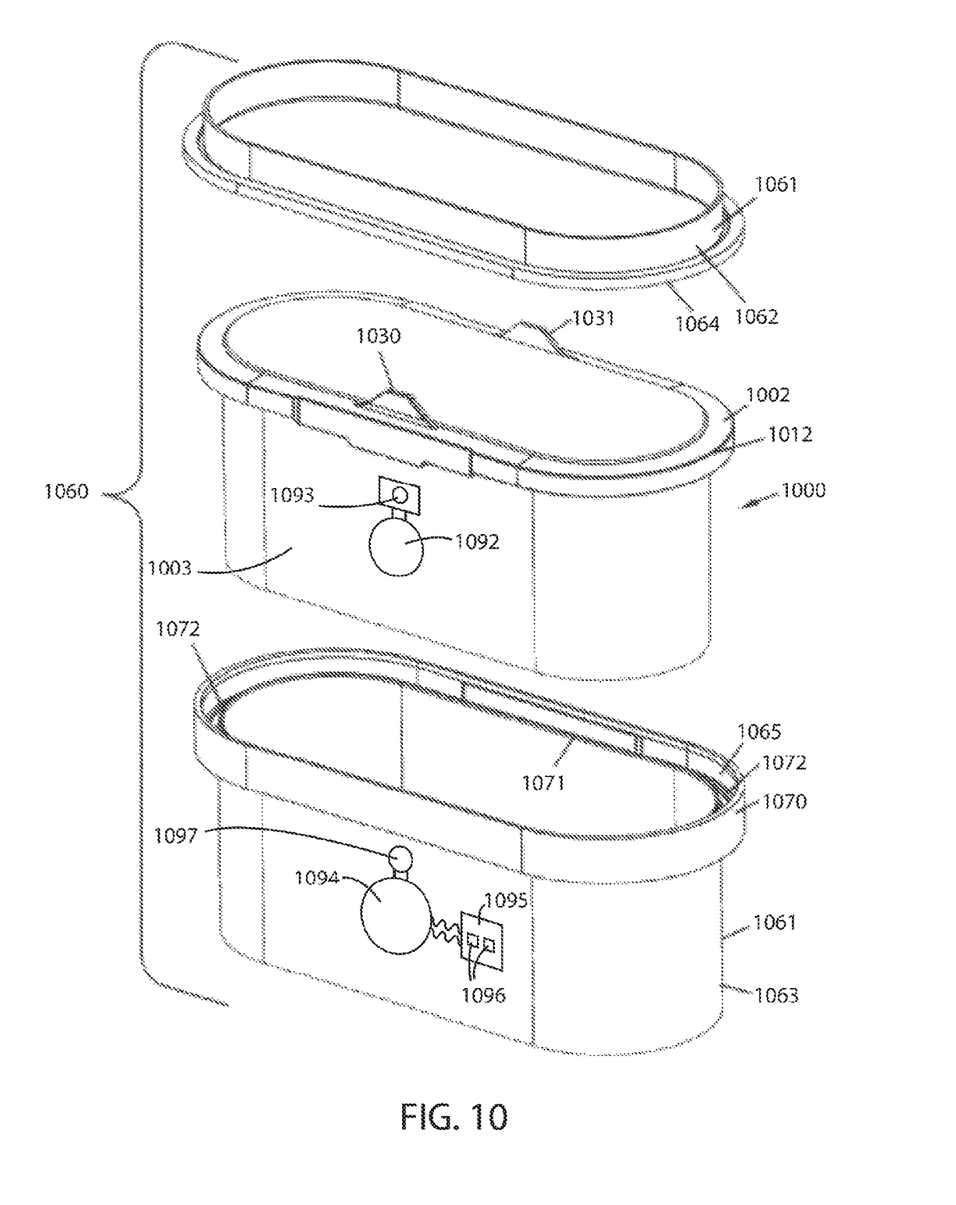
FIG. 10 is a schematic exploded perspective view of a filtration system having a filter element therein in accordance with various embodiments herein.

Referring now to FIG. 10, a schematic exploded perspective view of a filtration system 1060 having a filter element 1000 therewith is depicted. The filtration system 1060 can include a housing 1061 having housing sections 1062, 1063 between which axial housing seal arrangement 1002 would be positioned, and pinched, during installation. One of the housing sections 1063 will typically be a filter element receiver, and will include a receiving trough 1065 therein, into which seal arrangement 1002 is fit during installation. A second housing section 1063 would generally include a pressure flange 1064 oriented to apply pressure to surface during installation, helping to ensure that seal surface is pressed, to adequately pinch seal member 1012 against shelf or seal surface portions of trough 1065 for sealing. Various retention mechanisms such as bolts or over center latches can be used to apply and retain the force.

Still referring to FIG. 10, housing section 1063 includes a seal region outer perimeter rim 1070, which can surround seal arrangement 1002 and project therefrom in the same direction as optional handle members 1030, 1031, during installation. Filter element 1000 can recess within rim 1070.

Still referring to FIG. 10, the housing section 1063 also includes a seal region inner perimeter rim 1071, surrounding by rim 1070 and spaced therefrom by trough 1072 which includes a seal engagement surface. Rim 1071 is optional, but preferred. It will typically be positioned so that a portion of the seal arrangement or member 1012 will be positioned between rim 1071 and rim 1070, when the filter element 1000 is property installed.

A receiving antenna 1092, which can be part of wireless power receiver, and a signal emitter 1093, which can be part of a feedback channel circuit, can be associated with, such as disposed on or in, the filter element 1000. In particular, the receiving antenna 1092 can be disposed on or in a side wall 1003 of the filter element 1000 or on or in another component of the filter element 1000. An emitting antenna 1094 can be mounted on or in the housing 1061. The emitting antenna 1094 can be part of a wireless power emitter. A signal receiver 1097 can be associated with the housing 1061 and can receive a signal from the signal emitter 1093.

In some embodiments, the emitting antenna 1094 can be in electrical communication with a contact pad 1095 including electrical contacts 1096. The contact pad 1095 can facilitate connecting the emitting antenna 1094 with other equipment to convey power.

It is noted that the housing 1062 of FIG. 10 is schematic. The housing can also have additional features relating to its installation, air flow inlet, air flow outlet, etc. Also, the receiving antenna 1092 and the signal emitter 1093 can be in many different specific positions, such as on the inside of filter element 1000 or within or between other components of the filter element 1000 or filtration system.

Figure 11:
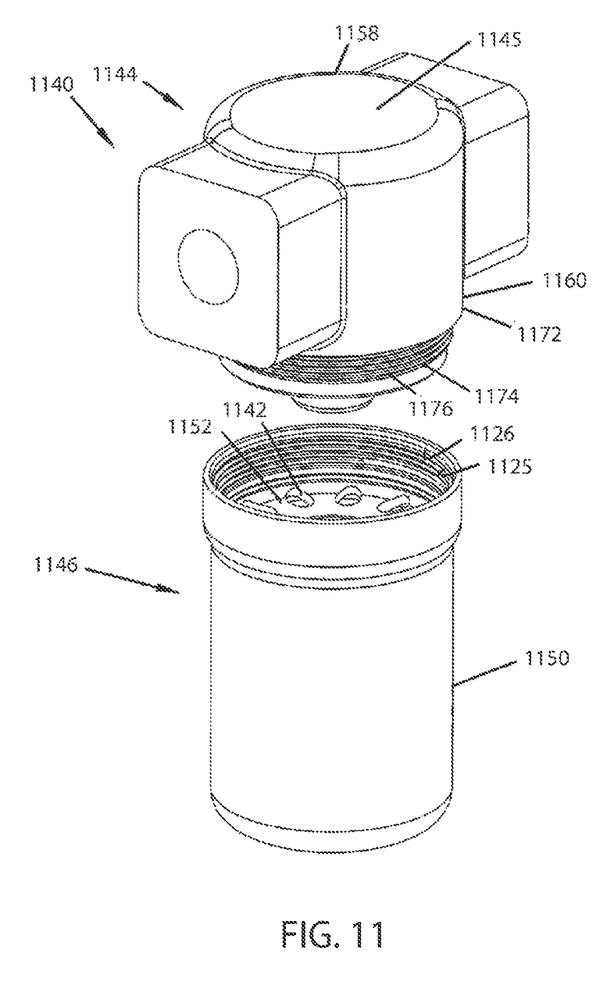
FIG. 11 is an exploded, perspective view of a filter assembly including a filter head and a spin-on canister filter in accordance with various embodiments herein.

Referring now to FIG. 11, an exploded, perspective view is shown of a filter assembly 1140 including a filter head 1144 and a spin-on canister filter 1146. The filter head 1144 is capable of operably receiving both spin-on canister filter 1146 and a bowl-cartridge filter (not shown). By "operably receiving", it is meant that the filter head 1144 includes appropriate structure for engaging the spin-on canister filter 1146, such that fluid to be cleaned is directed through the appropriate channels and cleans the fluid as intended. In reference to FIG. 11, the spin-on canister filter 1146 includes single-use housing 1150 and baffle plate 1152. The housing 1150 defines a filter interior permanently holding a non-replaceable cartridge filter (filter element). In some embodiments, the filter head 1144 includes an end face 1145.

The baffle plate 1152 includes a plurality of apertures 1142 to permit fluid flow from the filter head 1144 into the interior volume of the spin-on canister filter 1146.

The filter head 1144 includes a block 1158 including a continuous exterior wall member 1160 forming an outer tube surrounding an internal volume. The filter head block 1158 can define a first port, which in forward flow systems is an inlet port, and a second port, which in forward flow systems is an outlet port, and an interior or center tube, which is within the internal volume and is circumscribed by the outer tube.

In some embodiments, the outside surface 1172 can have first mechanical connection structure 1174. The first mechanical connection structure 1174 includes many types of arrangements. Of those arrangements possible, examples include threads, bayonet connections, bead and groove connections, etc. In the particular embodiment illustrated, the first connection structure 1174 includes a first plurality f threads 1176. In this particular embodiment, the first plurality of threads 1176 is located on the outside surface 1172 of the wall member 1160. However, in other embodiments, the first plurality of threads can be located along the inside surface of the wall member 1160.

The spin-on canister filter 1146 can include a second mechanical connection structure 1125, which in this case, is depicted as threads 1126. The threads 1126 engage the first plurality of threads 1176 of the first connection structure 1174.

A wireless power receiver, control circuit, and feedback channel circuit (not shown in this view) can be associated with, such as disposed on or in, the spin-on canister filter 1146. A wireless power emitter and a signal receiver can be associated with, such as disposed on or in, the filter head 1144 or a component thereof such as the wall member 1160. A wireless power receiver and/or feedback channel circuit can be associated with and/or disposed in or on the single use housing 1150 or a portion thereof. For example, in some embodiments, a wireless power receiver and/or feedback channel circuit can be associated with and/or disposed in or on a drain and/or a water-in-fuel sensor associated with the single use housing 1150.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A filtration system comprising:
   a filter element comprising:
   a filter body;
   a filter media disposed within the filter body;
   a wireless power receiver associated with the filter body;
   a control circuit in electrical communication with the wireless power receiver; and
   a feedback channel circuit in communication with the control circuit, the feedback channel circuit comprising an optical feedback channel circuit; and a filter housing, the filter housing defining an interior volume, the filter element configured to fit within the interior volume of the filter housing;

a wireless power emitter associated with the filter housing; and a signal receiver associated with the housing;

wherein the filter housing defines a fluid flow path between the filter housing and the filter element, wherein the fluid flow path passes through the optical feedback channel circuit, and wherein the optical feedback channel circuit is configured to evaluate at least one property of a fluid passing through the fluid flow path.

2. The filtration system of claim 1, the wireless power receiver comprising an inductive power receiver.

3. The filtration system of claim 1, the wireless power receiver comprising an RF power receiver.

4. The filtration system of claim 1, the filter element further comprising an optical emitter in electrical communication with the optical feedback channel circuit.

5. The filtration system of claim 4, the optical emitter comprising an IR light emitting diode.

6. The filtration system of claim 4, wherein the fluid flow path passes between the optical emitter and the signal receiver.

7. The filtration system of claim 1, further comprising a sensor in electrical communication with the control circuit.

8. The filtration system of claim 7, the sensor comprising a pressure sensor.

9. The filtration system of claim 7, the sensor comprising a temperature sensor.

10. The filtration system of claim 7, the sensor comprising a vibration sensor.

11. The filtration system of claim 7, the sensor comprising a gas concentration sensor.

12. The filtration system of claim 7, the sensor comprising a turbidity sensor.

13. The filtration system of claim 7, the sensor comprising an absorbance sensor.

14. The filtration system of claim 7, wherein data derived from the sensor is transmitted to an external receiver through the feedback channel circuit.

15. The filtration system of claim 1, wherein the wireless power receiver permanently integrated into the filter body.

16. The filtration system of claim 1, wherein the wireless power receiver is removably attached to the filter body.

17. The filtration system of claim 1, the signal receiver comprising an optical detector.

18. The filtration system of claim 1, wherein the at least one property of a fluid passing through the fluid flow path comprises at least one of turbidity, color, and absorbance.

19. The filtration system of claim 1, wherein the optical feedback channel circuit comprises a first electrode and a second electrode wherein the fluid flow path passes between the first electrode and the second electrode.

20. The filtration system of claim 1, wherein the optical feedback channel circuit comprises a vibration emitter and a vibration detector wherein the fluid flow path passes between the vibration emitter and the vibration receiver.

* * * * *